F. B. REDINGTON & M. J. MILMOE.
CUTTING MECHANISM.
APPLICATION FILED JUNE 3, 1914.

1,296,554.

Patented Mar. 4, 1919.
2 SHEETS—SHEET 1.

Witnesses:
Arthur H. Carlson
Robert H. Weir

Inventors:
Frank B. Redington
Michael J. Milmoe
By Brown Nissen Harwell
Attys.

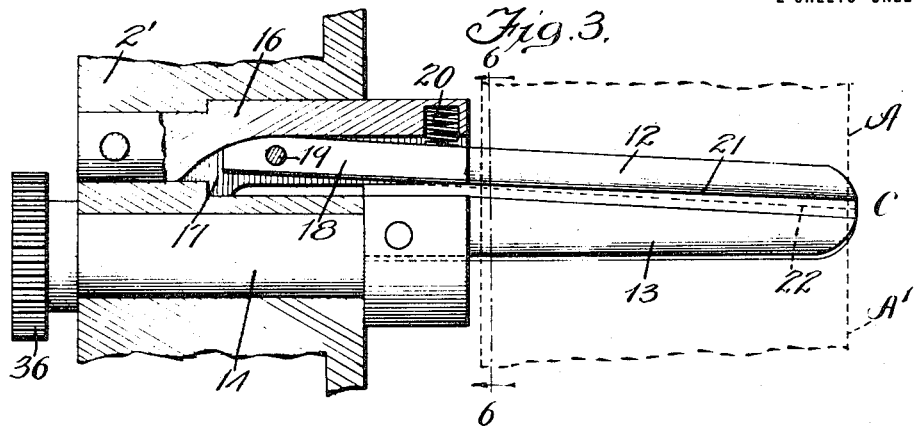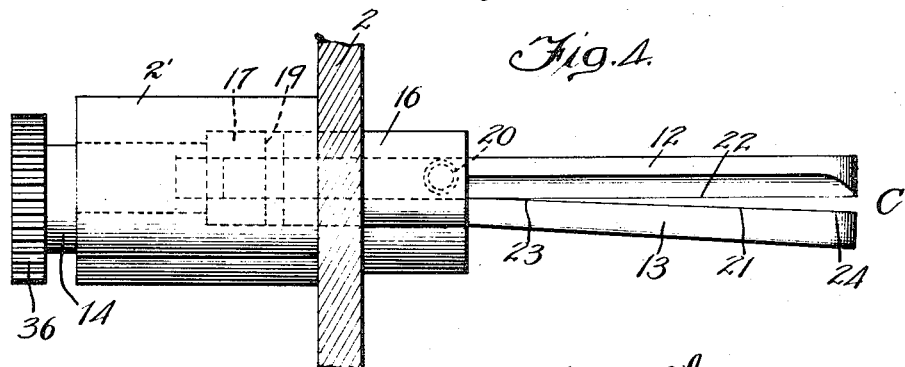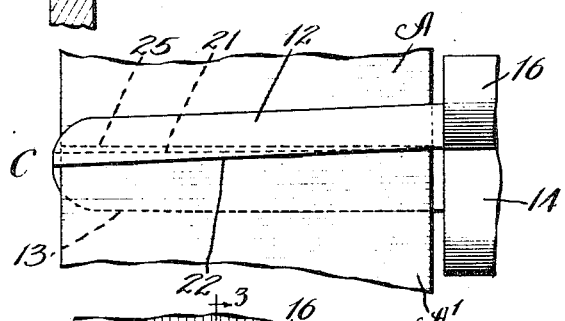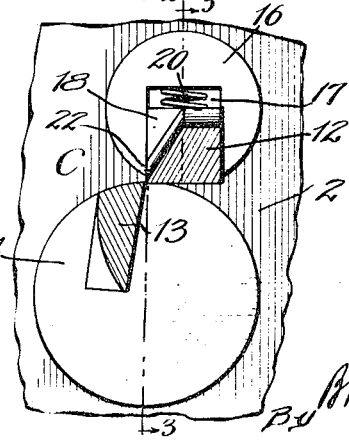

UNITED STATES PATENT OFFICE.

FRANK B. REDINGTON AND MICHAEL J. MILMOE, OF CHICAGO, ILLINOIS, ASSIGNORS TO PACKAGE MACHINERY COMPANY, OF SPRINGFIELD, MASSACHUSETTS, A CORPORATION OF MASSACHUSETTS.

CUTTING MECHANISM.

1,296,554.     Specification of Letters Patent.     Patented Mar. 4, 1919.

Original application filed March 22, 1913, Serial No. 756,087. Patent No. 1,133,668, dated March 30, 1915. Divided and this application filed June 3, 1914. Serial No. 842,581.

*To all whom it may concern:*

Be it known that we, FRANK B. REDINGTON and MICHAEL J. MILMOE, citizens of the United States, residing at Chicago, in the county of Cook and State of Illinois, have invented certain new and useful Improvements in Cutting Mechanism, of which the following is a specification.

Our invention relates to improvements in cutting mechanism, and has particular reference to cutting mechanism of the shear type, for cutting fabric or other material such as paper strips and the like while such material is in motion.

One of the objects of our invention is to provide an improved mechanism of the character described which will be simple, durable and reliable in construction, and efficient in operation.

Other objects of our invention will appear hereinafter.

Referring to the accompanying drawings,—

Fig. 3 is a cross sectional view through the frame and the support for the stationary shearing blade taken on the line 3—3, Fig. 6, but showing in elevation the upper shearing blade, the lower shearing blade and the supporting parts for the latter blade.

Fig. 4 is a top plan view of the parts shown in Fig. 3, showing the plate 2 in section on a line above the projection in which shafts 14 and 16 are carried.

Fig. 5 is a view in elevation of the cutting knives or blades, showing the strip of material in position to be cut thereby; and Fig. 6 is a transverse sectional view on the line 6—6 of Fig. 3.

Figure 1:
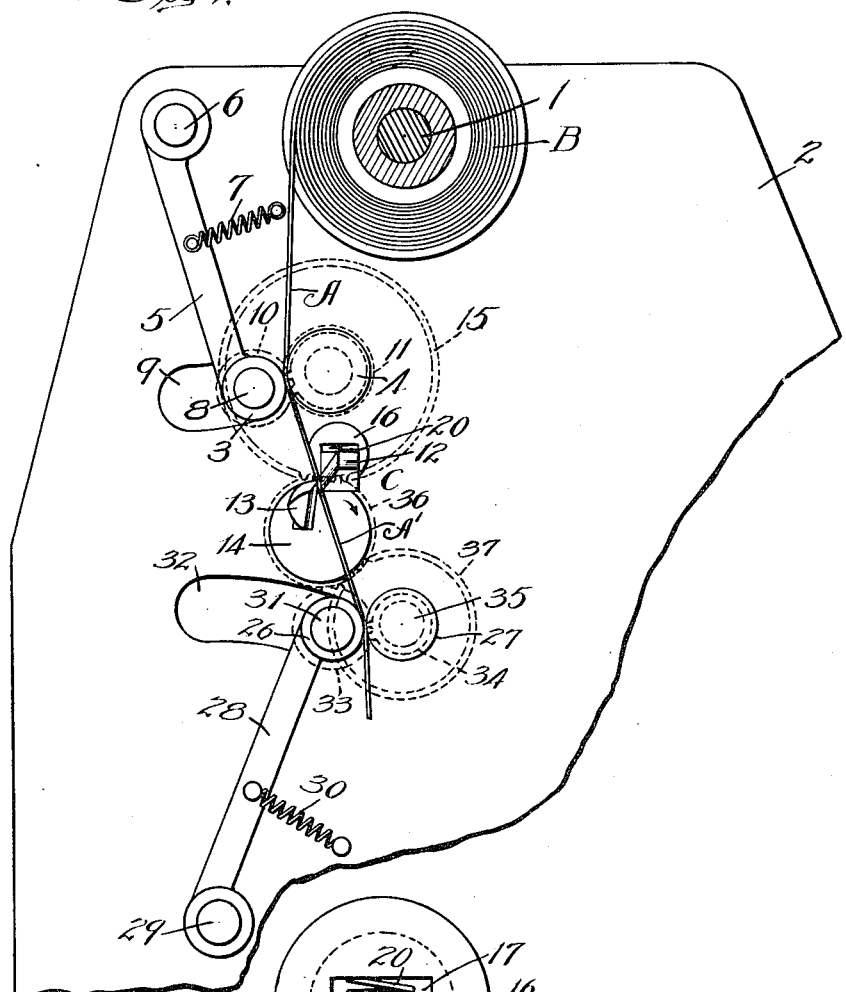
Figure 1 is a view in elevation of the cutting mechanism and associated parts embodying our invention.
Figure 2:
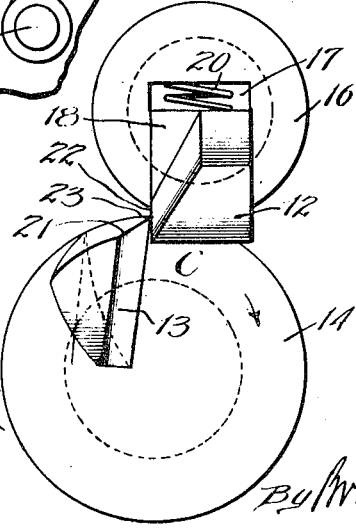
Fig. 2 is an enlarged end view of the cutters proper.

This application is a division of our copending application Serial No. 756,087, filed March 22, 1913, relating to chewing gum wrapping machines. In describing the structure embodying our present invention, we will describe it as it is used in connection with a chewing gum wrapping machine of the type referred to, covered in said copending application, but it will be obvious to one skilled in the art, after having obtained an understanding of our invention from the disclosures herein made, that our invention is capable of modification without departing from the scope and spirit thereof, and we wish it to be so understood. The details of said chewing gum wrapping machine, and the application of our present cutting mechanism to said machine, may be had by reference to said co-pending application. Suffice it to say here that in said co-pending application the cutting mechanism is used for cutting end pieces from a long continuous strip of uniformly wide paper, which end pieces are fed to the wrapping machine and applied as "inner wrappers" for the sticks of gum. In the present drawings, the reel or spool which holds the supply or continuous strip A, of paper, is indicated at B, Fig. 1. This reel is mounted to rotate upon a suitable shaft or stud 1 outstanding from the face of a supporting frame 2 of the machine. This frame is of the same construction as shown and described in said co-pending application. The strip of paper A may be fed to the cutters or shears C in any suitable manner, but in this case it is drawn from the reel by means of a pair of feeding rolls 3 and 4. The roll 3 is carried upon a long arm 5, which is pivoted at 6 upon the frame, and said roll is yieldingly held in engagement with the fixed roll 4 by the spring 7, which is attached to the arm 5 and the frame. The shaft 8, upon which this roll 3 is mounted, extends through a slot 9 in the frame to the opposite side of the frame, and carries a gear 10 which meshes with and is driven by the gear 11 on the shaft of the roll 4. In the present structure, these two rolls serve to constantly feed the continuous strip of paper A to the shears or cutting knives C, which shears periodically clip or cut off end portions from said strip. The shears are composed of two members or blades 12 and 13, coöperating to sever end portions or pieces A¹ from the main strip of paper A which passes therebetween. The lower blade 13 is rotary in character and outstands from the end of the shaft 14, and is preferably driven in properly-timed relation by a gear 15, which is mounted upon the shaft of the gear 4 and through the medium of which the gears for the feed rolls 3 and 4 derive their motion. The upper shear blade 12 is also mounted to outstand from the end of a stud or mounting member 16, but this stud is fixed in the frame plate 2 of the machine and is not intended to rotate. The shafts 14 and 16 are carried in a projection 2' extending from the rear of the frame 2. The stud or mounting member 16 (see Figs. 3 and 4) has a longitudinal groove or channel 17 in its under side, in which the butt or inner end portion 18 of the upper shear blade is positioned. This butt end portion 18 is pivoted at 19 in the channel 17, so that it may oscillate or move about said pivot in a vertical plane, and a spiral spring 20 constantly yieldingly presses upon said butt end portion to maintain the upper blade in shearing or cutting relation to the lower blade 13. One of the important characteristics of our invention is that the parts are so constructed and arranged that the end portions or pieces A¹ will be cut or clipped from the main strip A while said main strip A is in motion and without interrupting its movement. It is of course desirable that the transverse cuts across the strip shall be substantially at right angles to the parallel side edges of the strip itself, so that the end pieces or portions which are clipped from said main strip will be substantially rectangular in form. This is particularly desirable where the end pieces are to be used as wrappers for articles of mechandise, such as sticks of gum. The lower shear or blade 13 is arranged to rotate constantly in the direction of the arrow, Fig. 2, and said blade is generally offset with respect to the longitudinal axis of the rotating shaft which carries said blade. Thus, in the rotation of the blade it will periodically arrive into cutting or shearing relation with respect to the upper blade 12. The axis of the shaft 14, on which the blade 13 is mounted, lies at right angles to the edges of the strip A of paper, as is clearly shown in Fig. 3. The cutting edge 22 of the upper shear blade 12 lies substantially parallel with the plane of the moving strip of paper, but the cutting edge 21 of the rotating shear blade 13 is angularly disposed with respect to the plane of said sheet of paper and with respect to the cutting edge 22 of the blade 13. This gives a true shearing cut across the strip of paper; in other words, during the rotation of the lower blade 13, the inner end portion 23 of its cutting edge arrives in shearing relation to the cutting edge of the upper blade before the outer end portion 24 of said cutting edge arrives in shearing relation to the cutting edge of the upper blade. To repeat: The outer end portion 24 of the lower blade cutting edge lags behind the inner end portion thereof during the rotation of said blade 13, and in consequence the cut progresses across the strip of paper. Since this cut is progressive in this manner, some time is necessarily consumed by the blades in cutting from the inner edge to the outer edge of the strip. Since a certain time period is required in making the cut from the inner edge of the strip to the outer edge, it will be noted that if these cutting edges were disposed exactly in a line at right angles to the parallel edges of said strip, the result would be a slanting cut; that is, a cut would be made which would not be at right angles to the parallel edges of the strip, because of the fact that the strip is moving downwardly while the cut is progressing across the strip. In order, therefore, to provide a square or right-angled cut, so to speak, we arrange the cutting edges of the shears so that they droop or incline downwardly from their inner end portions to their outer end portions, as indicated in Figs. 3 and 5. That is to say, these cutting edges are disposed at an angle to the parallel edges of the strip, the angle being in the direction in which the strip is moving. The point of shearing action therefore advances with the motion of the strip as it progresses across the strip. The degree to which these cutting edges are inclined or "angled" is proportioned to the speed at which the strip moves. Thus, it will be seen that while the cut progresses across the strip from the inner edge of the strip to the outer edge thereof, the strip is moving downwardly, but since the cutting edges of the shear blades are also inclined in that direction the resultant cut across the strip will be in a line substantially at right angles to the parallel edges of the strip of paper, this cut being indicated by the dotted lines 25, Fig. 5. It will be noted that the angle of inclination of the cutting edge 22 of the upper blade 12 is greater than that of the cutting edge 21 of the lower cutting blade, so that said upper cutting edge overlaps, so to speak, or lies in the path of the cutting edge 21 of the rotating blade. The upper blade 12, however, is held yieldingly in this position by the spring 20, as before described. It will be remembered that the inner end 23 of the rotating cutting edge arrives in cutting relation with the upper cutting edge 22 first, and, as the cut progresses across the strip of paper, the upper blade will gradually yield and rise under the action of the rotating lower blade, until the cut has been made completely across this strip. After finishing the cut, the lower blade continues its rotation and passes beyond the upper blade, and the upper blade will then drop into its normal position, ready to again coöperate with the lower blade when said lower blade again arrives in cutting relation thereto. This arrangement of inclining the blades at different angles insures the cutting edges of the blades being in proper cutting or shearing relation at all times during the cutting operation, and in consequence insures a clean, sharp, shearing cut. The end pieces or portions A¹, which are thus periodically cut from the main strip, may be disposed of in any suitable manner. In the structure shown, we have shown them as passing between two delivering rolls 26 and 27, similar to the feed rolls 3 and 4. The roll 27 is fixed and the roll 26 is mounted upon a long arm 28, which is pivoted at 29 to the frame. This arm also has a spring 30, which is attached to itself and to the frame for the purpose of yieldingly holding the two rolls together. The two sets of rolls therefore maintain the plane of the strip substantially parallel to the axis of rotation of the blade 13. The shaft 31 of the movable roll 26 passes through a slot 32 in the frame and carries a gear 33 on its end, which meshes with and is driven by a gear 34 on the shaft 35 of the fixed roll 27. The large gear 15 on the shaft of the feed roll 4 drives the rotary blade 13 by means of a gear 36 on the shaft 14 of said blade, said gear 36 meshing with the gear 15. The gear 36 in turn meshes with and drives a gear 37 on the shaft 35 of the delivering roll 27. It will, of course, be understood that any suitable driving arrangement for the rolls and cutting blade may be employed, but we have shown and described a train of intermeshed gears, which are all proportioned to drive the rolls and cutting blade in properly-timed relation. This train of gears may be driven from any suitable source of power, such, for instance, as is shown and described in our co-pending application above referred to.

We claim:

1. A cutting mechanism of the character described, having, in combination, a rotary blade, a relatively stationary blade, means for feeding a strip of paper or similar material across the path of rotation of said rotary blade and maintaining the plane of said strip substantially parallel to the axis of rotation of said blade in the neighborhood of said blades, said rotary blade having its axis disposed perpendicular to the edges of said strip and having its cutting edge extending at an angle causing the point of shearing action to progress across the strip and to advance with the motion of the strip, whereby said blades will sever said strip along a line perpendicular to the edges of said strip.

2. In a shearing mechanism the combination of a relatively stationary blade having one end mounted on a fixed pivot, means for holding the other end of said blade yieldingly in position for the shearing operation, and a rotatable blade mounted to coöperate with said stationary blade in performing the shearing operation, said blades being constructed and arranged to cause the point of contact of the two blades to move during the shearing operation from a point adjacent to said pivot toward the free end of the stationary blade.

3. The combination of means for advancing a strip of paper or similar material, a rotary shearing member having its axis disposed perpendicular to the edges of the strip and having its cutting edge disposed at an angle to the plane of said strip and also inclined in the direction of movement of the strip, and a relatively stationary shearing member yieldingly coöperating with said rotary shearing member to cut the moving strip on a line substantially at right angles to the edges thereof.

4. The combination with means for moving a strip of paper or similar material, of a cutting mechanism into which the strip is fed by said means, said mechanism comprising a relatively fixed shear blade having its cutting edge inclined in the direction of movement of the strip, and a rotary shear blade coöperating therewith and having its axis of rotation perpendicular to the edges of the paper to be cut, and having its cutting edge inclined in the direction of movement of the strip of paper and also angularly arranged with respect to a plane passing through the axis of rotation thereof, whereby said blades are operative while the strip is moving to sever said strip on a line at right angles to its edges.

5. The combination of means for moving a strip of paper or similar material, a rotary shearing member having its axis of rotation disposed perpendicular to the edge of the strip and having its cutting edge disposed at an angle to the plane of said strip and also inclined in the direction of movement of the strip, and a relatively fixed shearing member yieldingly coöperating with said rotary shearing member for cutting the moving strip on a line at right angles to the edge thereof, said relatively fixed shearing member having its cutting edge inclined in the direction of movement of the strip at a greater angle than said rotary shearing member and being yieldingly held at such inclination.

In testimony whereof we have signed our names to this specification, in the presence of two subscribing witnesses, on this 29th day of May, A. D. 1914.

FRANK B. REDINGTON.
MICHAEL J. MILMOE.

Witnesses:
  FRED G. BROOKS,
  CATHERINE BATES.